US009490044B2

(12) United States Patent
Kurihara et al.

(10) Patent No.: US 9,490,044 B2
(45) Date of Patent: Nov. 8, 2016

(54) COATED METAL FINE PARTICLE AND MANUFACTURING METHOD THEREOF

(71) Applicant: Yamagata University, Yamagata (JP)

(72) Inventors: Masato Kurihara, Yamagata (JP); Masatomi Sakamoto, Yamagata (JP)

(73) Assignee: Yamagata University, Yamagata (JP)

( * ) Notice: Subject to any disclaimer, the term of this patent is extended or adjusted under 35 U.S.C. 154(b) by 0 days.

(21) Appl. No.: 13/958,261

(22) Filed: Aug. 2, 2013

(65) Prior Publication Data

US 2013/0334470 A1    Dec. 19, 2013

Related U.S. Application Data

(63) Continuation of application No. PCT/JP2012/052480, filed on Feb. 3, 2012.

(30) Foreign Application Priority Data

Feb. 4, 2011    (JP) .................................. 2011-023198

(51) Int. Cl.
*H01B 1/22*    (2006.01)
*C09D 5/24*    (2006.01)
(Continued)

(52) U.S. Cl.
CPC . *H01B 1/22* (2013.01); *B22F 1/02* (2013.01); *B22F 3/10* (2013.01); *B22F 9/30* (2013.01); *C09D 5/24* (2013.01); *C09D 11/52* (2013.01); *C22C 5/06* (2013.01); *H01B 1/02* (2013.01)

(58) Field of Classification Search
CPC ............ H01B 1/00; H01B 1/22; C09D 5/24; B05D 5/12; B22F 1/0062
USPC ............................................... 252/500–521.6
See application file for complete search history.

(56) References Cited

U.S. PATENT DOCUMENTS 3,702,259 A * 11/1972 Nielsen ............................ 27/229
2002/0091291 A1* 7/2002 Nakashiro ..................... 568/956
(Continued)

FOREIGN PATENT DOCUMENTS

CN    1684785 A    10/2005
CN    101357403 A    2/2009
(Continued)

OTHER PUBLICATIONS

Kawazome, Mitsuru, et al., "Nano Particles Fine Pitch Wiring for Printed Electronics," The Micromeritics No. 50 (2006/2007), pp. 27-31.
(Continued)

*Primary Examiner* — Mark Kopec
(74) *Attorney, Agent, or Firm* — McCracken & Gillen LLC

(57) ABSTRACT

Objects of the invention are to provide a method in which coated metal fine particles are smoothly manufactured when the coated metal fine particles are manufactured using a metal amine complex decomposition method, and, particularly, to provide coated metal fine particles that can be smoothly sintered even at a low temperature. The manufacturing method of coated metal fine particles includes a first step of mixing an amine liquid mixture of an alylamine having 6 or more carbon atoms and an alkylamine having 5 or less carbon atoms with a metal compound including one or more metal atoms, thereby generating a complex compound including the metal compound and amines; and a second step of heating and decomposing the complex compound, thereby generating coated metal fine particles.

9 Claims, 5 Drawing Sheets

(51) Int. Cl.
*B22F 1/00* (2006.01)
*B22F 1/02* (2006.01)
*B22F 3/10* (2006.01)
*B22F 9/30* (2006.01)
*H01B 1/02* (2006.01)
*C22C 5/06* (2006.01)
*C09D 11/52* (2014.01)

(56) References Cited

U.S. PATENT DOCUMENTS

2005/0129843 A1* 6/2005 Wu et al. .................. 427/180
2009/0031856 A1* 2/2009 Lee et al. .................. 75/343
2010/0247422 A1* 9/2010 Chung et al. .............. 423/604

FOREIGN PATENT DOCUMENTS

| CN | 101684214 A | * | 3/2010 | ............ C09D 11/52 |
|----|----|----|----|----|
| JP | 2005-298921 | | 10/2005 | |
| JP | 2008-081827 | | 4/2008 | |
| JP | 2008-133527 | | 6/2008 | |
| JP | 2008-214591 | | 9/2008 | |
| JP | 2008-214695 | | 9/2008 | |
| JP | 2009-030170 | | 2/2009 | |
| JP | 2009030170 A | * | 2/2009 | |
| JP | 2009-270146 | | 11/2009 | |
| JP | 2010-265543 | | 11/2010 | |
| KR | 10-0818195 | * | 3/2008 | ............... B82B 3/00 |
| WO | WO2011/126706 A2 | | 10/2011 | |
| WO | WO 2011126706 | * | 10/2011 | |

OTHER PUBLICATIONS

Japanese Patent Office International Search Report and Written Opinion dated May 1, 2012, for International Application No. PCT/JP2012/052480. (8 pages).

International Preliminary Report on Patentability with English translation issued by WIPO for International Application No. PCT/JP2012/052480 dated Aug. 15, 2013 (11 pages).

English translation of excerpts of Kawazome, Mitsuru, et al., "Nano Particles Fine Pitch Wiring for Printed Electronics," The Micromeritics No. 50 (2006/2007), pp. 27-31.

First Office Action, with English translation, issued by SIPO for Chinese Application No. 201280007639.1, dated Oct. 8, 2014, Applicant, Yamagata University (19 pages).

Japanese Office Action issued Jan. 6, 2015, and translation thereof, in corresponding JP Application No. 2011-023198, Applicant, Yamagata University. (28 pages).

Japanese Office Action issued Aug. 11, 2015, and translation thereof, in corresponding JP Application No. 2011-023198, Applicant, Yamagata University. (9 pages).

* cited by examiner

FIG. 1
(1) EXAMPLE 1
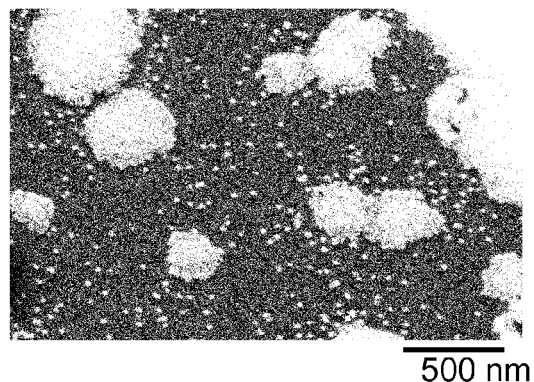
500 nm
(2) EXAMPLE 2
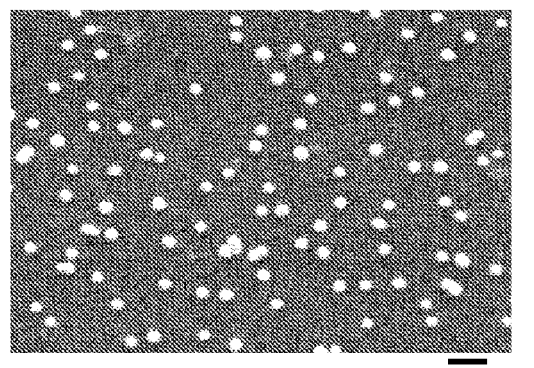
100 nm
(3) EXAMPLE 3
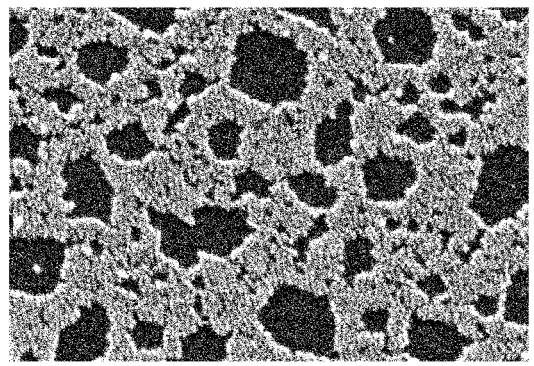
WHITE POINTS ARE NANO-SIZED SILVER FINE PARTICLES   100 nm
(4) COMPARATIVE EXAMPLE 1
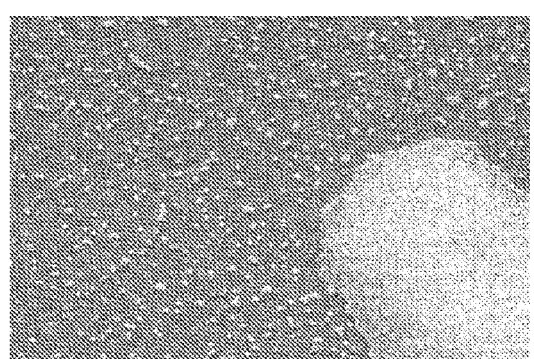
500 nm FIG. 2 (1) EXAMPLE 1
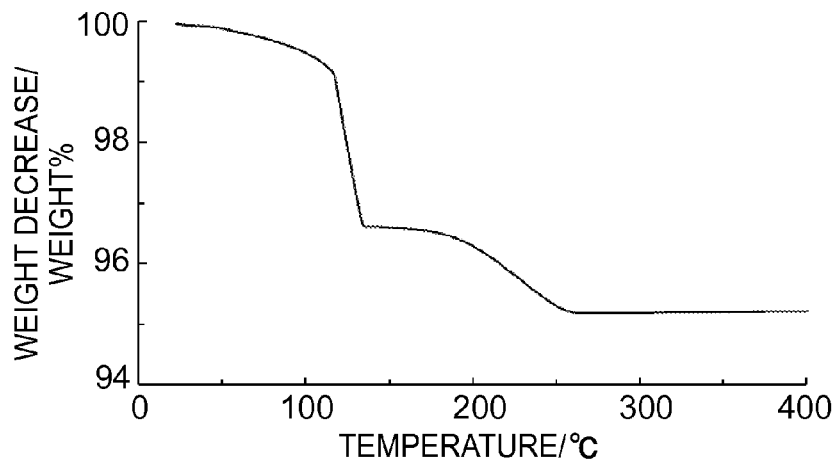
(2) EXAMPLE 2
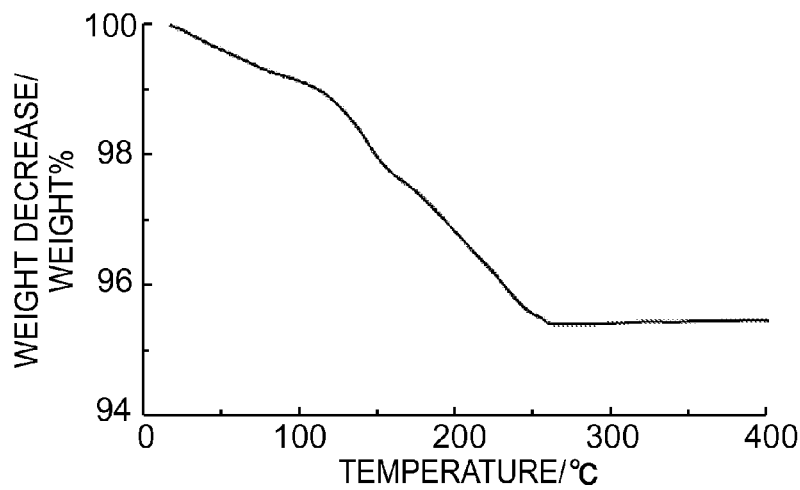
(3) COMPARATIVE EXAMPLE 1
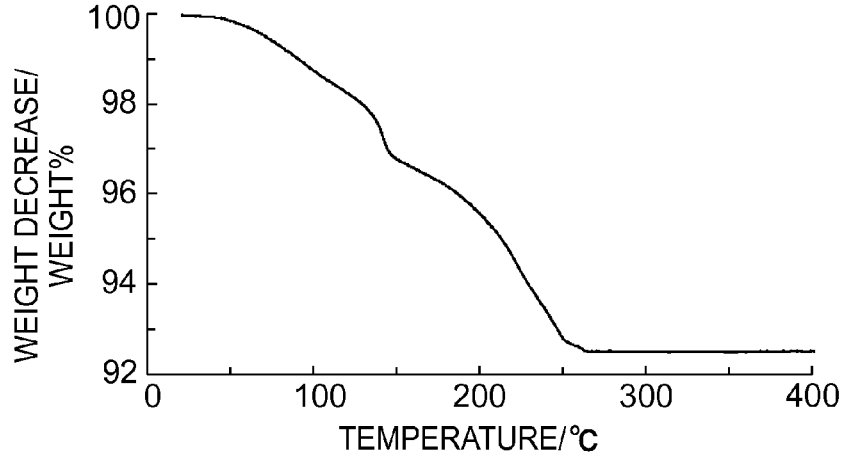

FIG. 6
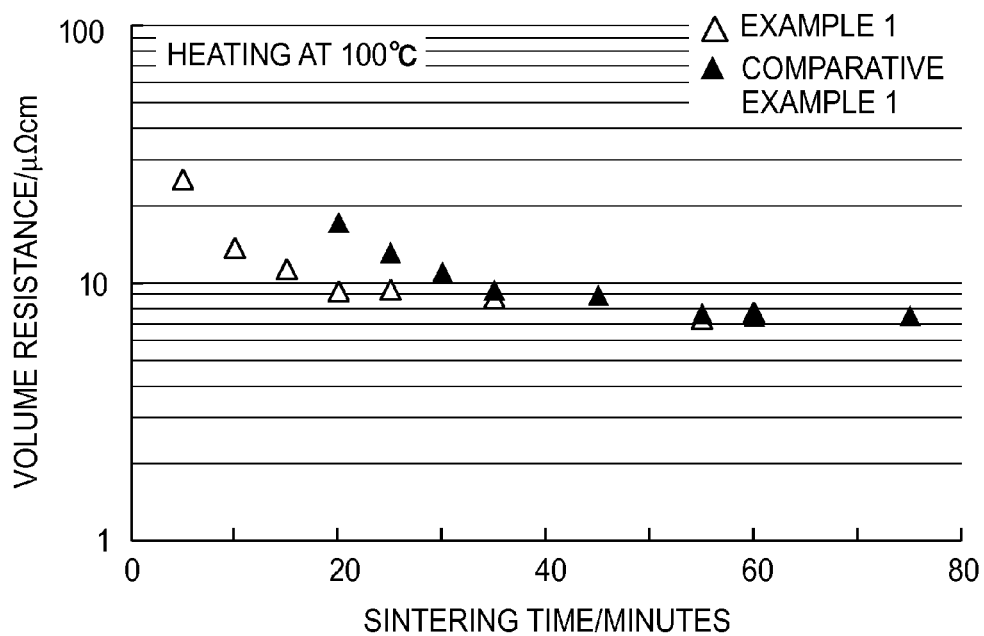
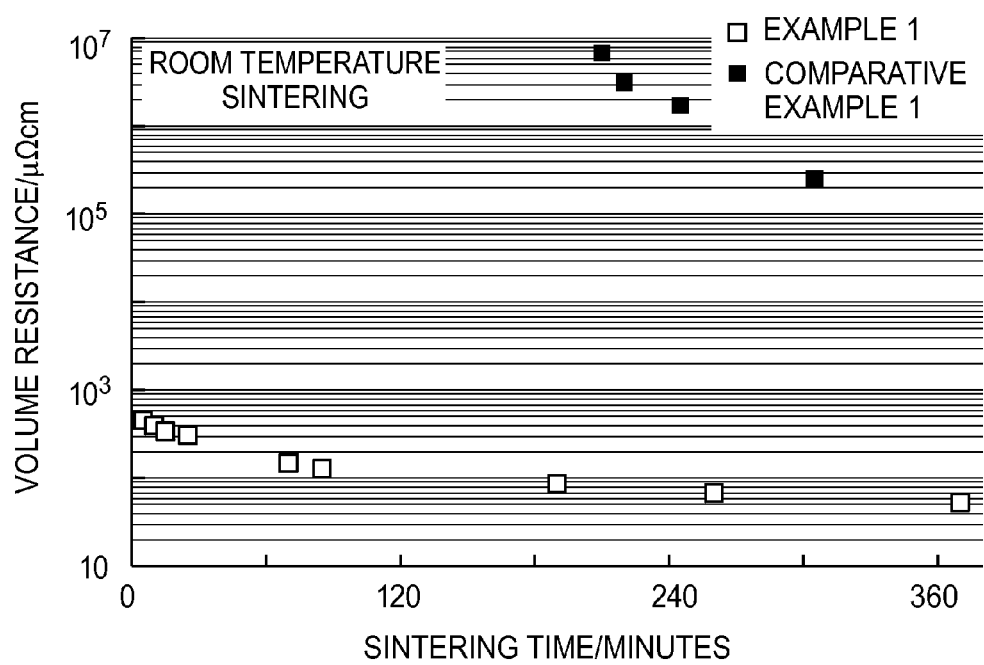

COATED METAL FINE PARTICLE AND MANUFACTURING METHOD THEREOF

CROSS-REFERENCE TO RELATED APPLICATIONS

The present application is a continuation of International Application No. PCT/JP2012/052480 filed on Feb. 3, 2012, which in turns claims the benefit of Japanese Patent Application No. 2011-023198, filed on Feb. 4, 2011. The entire contents of both of these applications are incorporated herein by reference.

BACKGROUND OF THE INVENTION

1. Field of the Invention

The present invention relates to nanometer-sized coated metal fine particles which have excellent dispersibility in a solvent and develop favorable conductive properties when sintered at a low temperature on a flexible print substrate or the like, particularly a manufacturing method of coated silver fine particles, and coated metal fine particles manufactured using the above method.

2. Description of Related Art

The remarkable advancement of electronic devices in recent years has been supported by the progress of electronic components, such as semiconductor devices, and the significant development of printed-wiring boards on which the electronic components are mounted. In addition, since the majority of electronic devices are reduced in size, thickness and weight, and, furthermore, there is a demand for improvement in productivity, a variety of corresponding efforts and improvements are further required for printed-wiring boards as well. Particularly, in order to do so, there is a demand for an increase in speed and density of mounting of a material for forming conductive wires of electronic components.

In such a situation, attempts are being made to form fine metal wires not only on polyimide, which has already been in use as a flexible printed-wiring substrate, but also on substrates of a variety of easily-processable organic polymers, such as polyethylene terephthalate (PET) and polypropylene, using a material that enables the formation of metal wires at a lower temperature. Particularly, in order to form metal wires using the existing ink jet printing techniques, studies to form wires by manufacturing an ink that is formed by dispersing nano-sized metal fine particles, printing a desired circuit shape using the ink, and then bonding the metal fine particles through sintering or the like, thereby forming a metal thin film are underway (for example, Mitsuru Kawazome et al., The MICROMERITICS No. 50, 27 to 31 (2006/2007)). In addition, in the final stage of a device, there are frequent cases in which a thermal treatment is strongly ruled out in repairing techniques that cover defects in fine wires, and, in such cases as well, there is a demand for a nano-sized silver fine particle dispersion fluid solution that sinters at an extremely low temperature of 100° C. or lower.

Of the past studies regarding nano-sized metal fine particles, for example, Japanese Laid-Open Patent Publication No. 2005-298921 discloses a manufacturing method of composite metal ultrafine particles in which two or more transition metal salts and amine compounds are thermally treated in an inert atmosphere. The document discloses that ultrafine particles having a nanometer (nm)-level particle diameter are formed, dispersed in a rather non-polar solvent, such as toluene, hexane, ligroin, petroleum ether or ethyl ether, and sintered using a thermal treatment at 200° C. to 300° C. However, it is unclear whether the particles are conductive. In addition, since the thermal treatment temperature is 200° C. or higher, only highly heat-resistant polyimide or the like can be used as an organic substrate having favorable workability.

In addition, Japanese Laid-Open Patent Publication No. 2008-214591 discloses a metal ink for which a polar solvent containing a silver colloid dispersed in a dispersion medium made up of water and a variety of alcohols is used, and describes that, when this ink is used, a silver conductive film can be formed by heating the ink to near 100° C.

In addition, Japanese Laid-Open Patent Publication No. 2008-214695 discloses that oleylamine, which is an alkylamine, is used as an essential component, oleylamine and the like are combined on silver oxalate and the like so as to form a complex compound, then, the generated complex compound is heated and thermally decomposed, thereby obtaining coated silver fine particles having uniformly-sized diameters. In addition, the document describes that, when a mixture of oleylamine and a predetermined amount of a saturated fatty acid amine is used, the generation of the complex compound becomes easy, and silver fine particles can be manufactured in favorable yield within a short period of time.

Furthermore, regarding the technique described in Japanese Laid-Open Patent Publication No. 2008-214695, Japanese Laid-Open Patent Publication No. 2010-265543 describes that, when the kind of the alkylamine is readjusted, particles can be sintered at near room temperature, which is an extremely low temperature as the sintering temperature of silver, particles can be dispersed at a high concentration in an organic solvent, and coated silver fine particles that can be extremely useful in a variety of uses are manufactured.

According to the conductive ink described in Japanese Laid-Open Patent Publication No. 2008-214591, a silver conductive film can be formed at a relatively low temperature, but a dispersion medium including water is used as a polar solvent, and therefore there is a problem with wettability when the ink is applied particularly to organic electronics, such as organic TFTs, such that the ink is easily repelled on a substrate.

Silver fine particles manufactured using the method described in Japanese Laid-Open Patent Publication No. 2008-214695 have an oleylamine layer on the surface, and therefore it becomes possible to manufacture mono-dispersed silver fine particles; however, on the other hand, there were problems in that the manufacturing process took a long time, and the kinds of available amines were limited. That is, there were problems that the reaction rate was not sufficient when oleylamine and silver oxalate generated a complex compound thereof, and, even in a case in which a mixture of a predetermined amount of a saturated fatty acid amine and oleylamine was used, coated silver fine particles could not be smoothly manufactured at all times. In addition, from the viewpoint of the generation of a complex compound as well, since oleylamine having a relatively high molecular weight was used as an essential component, the coating of silver fine particles to be manufactured became rigid such that particles could not be easily sintered at a low temperature at all times.

In addition, according to the method described in Japanese Laid-Open Patent Publication No. 2010-265543, the above problems were improved, but additional improvement in the manufacturing steps of coated silver fine particles or improvement in the performance of coated silver fine particles manufactured were expected.

SUMMARY OF THE INVENTION

Objects of the invention are to provide a method in which coated metal fine particles are smoothly manufactured using alkylamines and a metal compound by solving the above problems, and, particularly, to provide coated metal fine particles that can be smoothly sintered even at a low temperature.

In order to achieve the above objects, the invention provides a manufacturing method of coated metal fine particles including a first step of mixing an amine liquid mixture of an alkylamine having 6 or more carbon atoms, and an alkylamine having 5 or less carbon atoms with a metal compound including one or more metal atoms, thereby generating a complex compound including the metal compound and amines; and a second step of heating and decomposing the complex compound, thereby generating metal fine particles.

In addition, a manufacturing method of coated metal fine particles in which a molar ratio of the alkylamine having 5 or less carbon atoms is in a range of 10% to 80% with respect to a total amount of amines in the amine liquid mixture is provided.

In addition, a manufacturing method of coated metal fine particles in which a fatty acid is included in the amine liquid mixture is provided.

In addition, a manufacturing method of coated metal fine particles in which the metal compound contains silver atoms is provided.

A manufacturing method of coated metal fine particles in which the metal compound contains silver oxalate is provided.

Furthermore, coated metal fine particles covered with a coating including alkylamines in which an alkylamine having 5 or less carbon atoms is included in the coating are provided.

In addition, coated metal fine particles in which a weight fraction of the coating in the coated metal fine particles is 20 weight % or less are provided.

In addition, coated metal fine particles in which an average particle diameter of the coated metal fine particles is 30 nm or less are provided.

In addition, coated metal fine particles in which metal of the coated metal fine particles mainly includes silver are provided.

Furthermore, a coated metal microparticle dispersion solution in which the coated metal fine particles are dispersed in an organic solvent is provided.

In addition, a coated metal microparticle dispersion solution in which a weight fraction of metal fine particles is 30 weight % or more is provided.

As used herein, the singular forms "a", "an" and "the" are intended to include the plural forms as well, unless the context clearly indicates otherwise.

Advantageous Effect of the Invention

According to the invention, in a process of manufacturing coated metal fine particles using a metal amine complex decomposition method described in Japanese Laid-Open Patent Publication Nos. 2008-214695 and 2010-265543 and the like, it becomes possible to smoothly generate a complex compound of amines and a metal compound, and it becomes possible to shorten a time required for manufacturing. In addition, since it becomes possible to use a variety of amines depending on the use and the like of the coated metal fine particles, it becomes possible to provide coated metal fine particles that can be smoothly sintered at a temperature of, for example 100° C. or lower, and it becomes possible to form a conductive film and a conductive wire on a poorly heat-resistant plastic substrate, such as PET and polypropylene.

BRIEF DESCRIPTION OF THE DRAWINGS

FIG. 1 is a scanning electron microscopic (SEM) image of coated silver fine particles manufactured using the invention.

FIG. 2 is a view illustrating a weight change (thermogravimetric change) when heating the coated silver fine particles manufactured using the invention.

FIG. 6 is a view illustrating a difference in a change in a volume resistance of an applied film of coated silver fine particles caused by presence of short-chain alkylamines.

DESCRIPTION OF THE PREFERRED EMBODIMENTS

Figure 3:
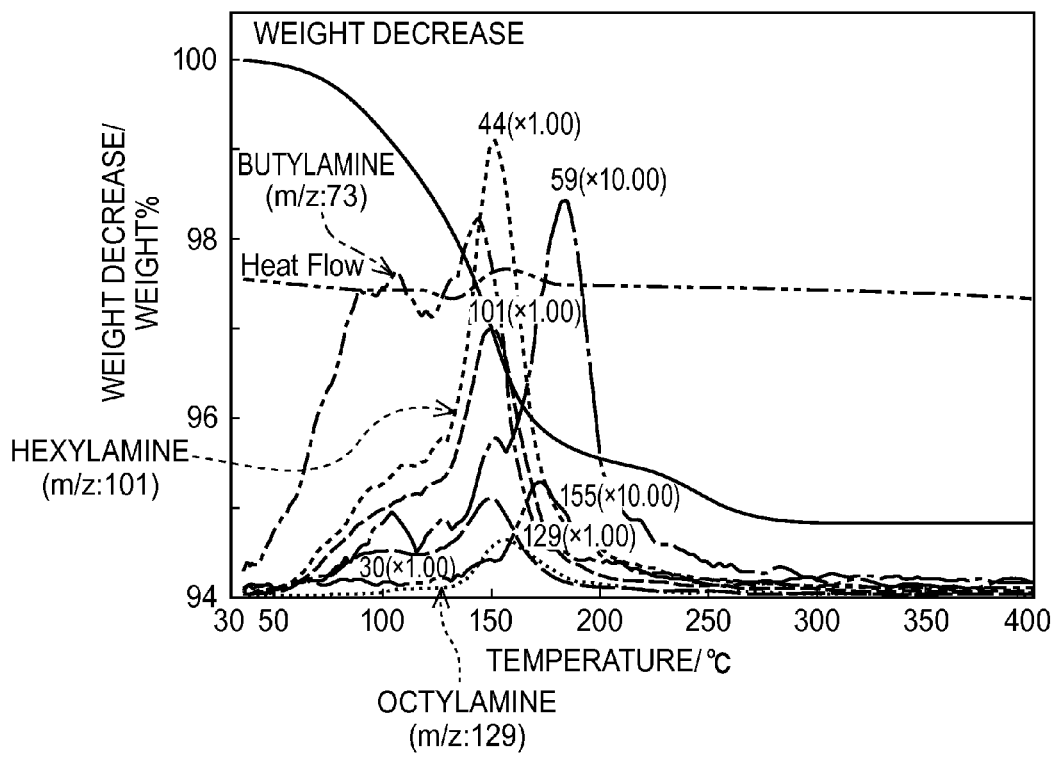
FIG. 3 is a view illustrating results of a mass analysis of a gas component eliminated when heating the coated silver fine particles (Example 1) manufactured using the invention.

Hereinafter, the manufacturing method of coated metal fine particles according to the invention and coated silver fine particles manufactured using the method according to the invention will be described. As described in Japanese Laid-Open Patent Publication No. 2008-214591, silver fine particles protected with alkylamines protective coating can be manufactured by heating complex compound consisted of a metal compound including silver, such as silver oxalate, and alkylamines in presence of alkylamines, and agglomerating atomic silver generated by decomposing the metal compound included in the complex compound.

As such, in the metal amine complex decomposition method in which a complex compound including metal compound is thermally decomposed in the presence of an amine, thereby manufacturing amine-coated metal fine particles, since atomic metal is generated using a decomposition reaction of a monospecific molecule which is a metal amine complex, it is possible to uniformly generate atomic metal in the reaction system, and an inhomogeneous reaction caused by the composition fluctuation of components that configure the reaction is suppressed in comparison to a case in which metal atoms are generated by a reaction among a plurality of components so that the method is advantageous when a large amount of fine metal particle is manufactured particularly in an industrial scale.

In addition, in the metal amine complex decomposition method, alkylamine molecules are coordinately bonded to metal atoms generated, and it is assumed that the motion of the metal atoms during the occurrence of agglomeration is controlled using the action of alkylamine molecules coordinated around the metal atoms. As a result, according to the metal amine complex decomposition method, it becomes possible to manufacture extremely fine metal fine particles having a narrow particle size distribution. Furthermore, since a number of alkylamine molecules also form relatively weak coordination bonds with the surfaces of metal fine particles manufactured, and the alkylamine molecules form dense protective coating on the surfaces of the metal fine particles, it becomes possible to manufacture clean coated metal fine particles having surfaces with excellent preservation stability. In addition, since the alkylamine molecules that form the coating can be easily eliminated through heating or the like, it becomes possible to manufacture metal fine particles that can be sintered at an extremely low temperature.

As described above, the metal amine complex decomposition method is a superior method for manufacturing extremely fine coated metal fine particles that can be sintered at a low temperature. Meanwhile, when metal fine particles are manufactured using the metal amine complex decomposition method, it is assumed that the reaction for generating a complex compound using the metal compound, an amine and the like, which are raw materials, progresses using a change in free energy as a driving force. Here, the change is caused when the amine and the like form coordination bonds with the metal atoms in the metal compound. However, the change in free energy in relation to the formation of the coordination is not always large. Due to this, there is a problem in that the formation of the complex compound does not progress smoothly at all times. In addition, since a solid-state metal compound was used as a supply source of the metal atoms in many cases, and the generation reactions of the complex compound and the like were caused only at the solid-liquid interfaces between both components, generally, a long mixing treatment was required in order to complete the generation reactions of the complex compound and the like having a weak driving force. Furthermore, there was a problem in that the complex compound of both components and the like could not be favorably generated depending on selection of the metal compound or the amine.

As a result, there were problems in that it was difficult to efficiently manufacture coated metal fine particles using the above manufacturing method, and the metal compound or the amine used to manufacture the fine particles was limited. Furthermore, there was another problem in that the characteristics of coated silver fine particles being manufactured were limited mainly because the kind of the amine used was limited.

As means for solving the above problems, the present inventors described in the previously disclosed Japanese Laid-Open Patent Publication No. 2008-214695 3 that coated silver fine particles that can be sintered at a low temperature could be manufactured by synthesizing a complex compound at a low temperature without using a solvent within a short period of time by combining a short or medium-chain alkyldiamine having a stronger polarity with a short or medium-chain alkylamine having a boiling point of 100° C. to 250° C., and using the complex compound. Since the coated silver fine particles manufactured using the above method can be sintered at near room temperature, which is an extremely low temperature as the sintering temperature of silver, and can be dispersed at a high concentration in an organic solvent, for example, when the fine particles are used as an ink in a state of being dispersed in an appropriate dispersion medium, a favorable conductive film can be formed even on a poorly heat-resistant plastic substrate or the like, and the fine particles can be extremely useful in a variety of uses.

As a result of carrying out a variety of studies in order to further improve the technique disclosed in Japanese Laid-Open Patent Publication No. 2008-214695, the inventors found that, when a composite compound, such as a complex compound, was generated by mixing a solid-form metal compound and an amine, the generation of the composite compound, such as a complex compound, became easy by mixing a short-chain alkylamine having 5 or less carbon atoms with a long-chain or middle-chain alkylamine which was a main component of a film of coated silver fine particles, and it became possible to manufacture the composite compound through a short period of mixing. In addition, when a mixture with the short-chain alkylamine was used, it became possible to manufacture favorable coated silver fine particles even in a case in which a variety of long-chain or middle-chain alkylamines other than oleylamine used as an essential component in Japanese Laid-Open Patent Publication No. 2008-214591 were used as main components, and it became possible to manufacture coated silver fine particles having characteristics suitable for a variety of uses.

When a mixture of a predetermined amount of the short-chain alkylamine and the long-chain or middle-chain alkylamine is used, while a mechanism that facilitates the generation of the composite compound with a silver-containing compound is not clear, since there is a tendency of the short-chain alkylamine having a stronger polarity than the long-chain or middle-chain alkylamine, it is considered that a bonding energy is strong when coordination bonds are formed with respect to metal atoms in the metal compound, and the driving force for the generation of the composite compound improves. In addition, since the short-chain alkylamine is a small molecule, it is considered that the permeability into the solid-state metal compound is high, and the effective opportunities for the generation of the composite compound of the long-chain or middle-chain alkylamine and the metal compound are increased by dividing the agglomeration structure of the metal compound, whereby the apparent generation rate of the composite compound of the long-chain or middle-chain alkylamine and the metal compound improves.

Hereinafter, a method for manufacturing coated metal fine particles using the invention will be specifically described. Particularly, a method for manufacturing silver fine particles as the metal fine particles manufactured will be specifically described. Metal silver is particularly suitable for the formation of metal wires using ink jet printing or the like since the high electrical conductivity makes metal silver advantageous in forming an electric circuit, metal silver is stable in the atmosphere so that metal silver is not easily oxidized even in a case in which metal silver is pulverized into fine powder, and the high self-diffusion coefficient allows the expectation of sintering at a lower temperature. In addition, since the invention can be applied to the manufacturing of metal fine particles other than silver, such as copper fine particles or nickel fine particles, it is needless to say that the invention is useful in forming wires using the fine particles and the like.

Manufacturing of Coated Metal Fine Particles Using the Metal Amine Complex Decomposition Method The manufacturing of coated metal fine particles using the metal amine complex decomposition method is mainly made up of a step of mixing a metal compound and an amine so as to generate a complex compound between the metal compound and the amine, and a step of heating the complex compound, liberating atomic metal from the metal compound included in the complex compound, and agglomerating the atomic metal, thereby forming metal fine particles.

Generally, the complex compound of the metal compound and the amine is generated by mixing a predetermined amount of an amine mixture and a powder-form metal compound. Using the fact that a complex compound generated generally exhibits a color determined by the components, the end point of the generation reaction of the complex compound can be detected by detecting the end of a change in the color of a mixture caused by the reaction through an appropriate spectroscopy or the like. In addition, complex compounds formed by silver oxalate mainly used in the following examples are generally colorless (white); however, even in this case, the generation state of the complex compound can be detected based on the state change, such as a change in the viscosity of the liquid mixture. Since the mixing of the metal compound and the amine mixture suppresses the generation of the decomposition reaction of the metal compound or the evaporation of the components of the amine mixture, the metal compound and the amine mixture are preferably mixed at a sufficiently low temperature. Typically, a complex compound can be generated through stirring at near room temperature, but the coordination reaction of an amine with respect to a silver compound causes heat generation, and therefore it is also preferable to cool the mixture to room temperature or lower and stir the mixture as necessary in order to suppress the decomposition reaction or the like of the metal compound.

In generating the complex compound of the metal compound and the amine, the total amount of the amine included in the amine mixture is desirably set to the stoichiometric amount or higher with respect to the metal atoms included in the metal compound. When the total amount of the amine is equal to or smaller than the stoichiometric amount with respect to the metal atoms, metal compound which does not become the complex compound bloats the metal fine particles generated, or remains as a metal compound which is not thermally decomposed, which is not preferable. Typically, since metal fine particles having uniform particle diameters can be stably obtained in a case in which the total amount of the amine included in the amine mixture is twice or more the molar amount of the metal atoms, it is considered that all the metal atoms can be reliably coordinated by the amine with the above degree of an amine amount. In addition, when the amine becomes five times or more the molar amount of the metal atoms, the concentration of the metal atoms in the reaction system decreases such that the final collection yield of metal decreases, and the environmental load increases, and therefore the amount of the amine used is preferably set to five times or less the molar amount of the metal atoms. Meanwhile, in a case in which the molar ratio of the total amount of the metal atoms and the amine is set to the stoichiometric amount, all the amine is coordinated around the metal atoms such that a complex compound is formed and a dispersion medium that holds the reaction system does not exist, and therefore it is also preferable to mix a material that forms a reaction solvent, such as methanol, with the amine mixture as necessary.

In the metal amine complex decomposition method, the amine controls a manner in which the atomic metal generated by the decomposition of the metal compound agglomerates so as to form fine particles, and plays roles of preventing re-agglomeration of fine particles by forming coating on the surfaces of the formed metal fine particles and of supplying arbitrary characteristics to the surfaces of the fine particles.

In a case in which, using the coated metal fine particles manufactured using the metal amine complex decomposition method, an ink-form matter is manufactured by dispersing the coated metal fine particles in an organic solvent at a high fraction or a paste-form matter is manufactured by mixing the coated metal fine particles with a binder, and the coated metal fine particles are sintered at a low temperature using the ink-form or the paste-form matter, an amine to be used is desirably an alkylamine, an alkyldiamine or the like which has an amino group bonded to a part of an alkyl group. In the present specification, the alkylamine refers to an amine having an amino group bonded to an alkyl group, and the alkyldiamine refers to an amine having two amino groups bonded to an alkyl group. In addition, in a case in which, simply, an amine is mentioned, examples of the amine include an alkylamine, an alkyldiamine and amines having other structures.

The coated metal fine particles manufactured using the metal amine complex decomposition method, in which an alkylamine or the like is used, exhibits a high affinity to an organic substance, such as an organic solvent, due to the influence of the alkyl group in the alkylamine that forms a coating. In addition, when an alkylamine having a relatively high vapor pressure at approximately 100° C. is mainly used, the alkylamine is more easily evaporated due to heating or the like of the coated metal fine particles, and the coating is removed so that it becomes possible to sinter the metal fine particles.

The amine used in the invention enables the formation of coordinate bonds with respect to silver atoms in the metal compound or the surfaces of metal fine particles through the amino group, and therefore the amino group included in the amine is desirably $RNH_2$ (R is a hydrocarbon chain) which is a primary amino group or $R_1R_2NH$ ($R_1$ and $R_2$ are hydrocarbon chains, and may be the same or different) which is a secondary amino group. When a primary or secondary amino group is included, coordinate bonds are generated with the metal atoms due to non-covalent electron pairs possessed by a nitrogen atom in the amino group so that a complex compound of the amine and the metal compound can be formed, and an amine coating can be formed with respect to the manufactured metal fine particles. In contrast to the above, in a case in which a tertiary amino group is included, generally, a free space around the nitrogen atom in the amino group is narrow, and therefore coordinate bonds are not easily generated with respect to the metal atoms, which is not desirable.

In the alkylamine and the like, a tendency that, as the molecular weight of the alkyl group increases and the alkylamine becomes a long chain, generally, the vapor pressure decreases so that the boiling point increases is shown. On the other hand, the short-chain alkylamine and the like having an alkyl group with a low molecular weight exhibits a tendency of a high vapor pressure and an intensifying polarity. In addition, the alkyldiamine having two amino groups in a molecule exhibits a tendency of the polarity becoming stronger than that of the alkylamine having one amino group in a molecule. In the invention, attention is paid to the above tendencies of the alkylamine and the like, the alkylamine and the like are classified particularly using the molecular weight of the alkylamine and the like or the number of the amino groups, and a plurality of kinds of amines are mixed depending on purpose, and used as an amine mixture. In the specification, the alkylamine and the like are classified into a short-chain amine when the number of carbon atoms included in the alkyl group is 2 to 5, a middle-chain amine when the number of carbon atoms is 6 to 12, and a long-chain amine when the number of carbon atoms is 13 or more.

In the invention, as the amine mixture used, an amine mixture containing a long-chain or middle-chain alkylamine formed by bonding one amino group to a long chain and/or middle-chain alkyl group is preferably used from the viewpoint of forming a favorable coating on the mainly manufactured metal fine particles. Since the long-chain or middle-chain alkylamine generally has a low vapor pressure, is not easily evaporated, and has a high affinity to an organic solvent, when an amine mixture containing the long-chain or middle-chain alkylamine is used, a predetermined fraction of the long chain or middle-chain alkylamine is included in a film of coated metal fine particles to be manufactured, the preserving property improves, and it is possible to improve the dispersibility into a non-polar organic solvent.

Examples of the long-chain or middle-chain alkylamine include dipropylamine (107° C.), dibutylamine (159° C.), hexylamine (131° C.), cyclohexylamine (134° C.), heptylamine (155° C.), 3-butoxypropylamine (170° C.), octylamine (176° C.), nonylamine (201° C.), decylamine (217° C.), 3-aminopropyltriethoxysilane (217° C.), dodecylamine (248° C.), hexadecylamine (330° C.), oleylamine (349° C.) and octadecylamine (232° C. (at 32 mmHg)), which are practical since they are easily available, but the long-chain or middle-chain alkylamine is not limited thereto, and any long-chain or middle-chain alkylamine can be appropriately used depending on use as long as the number of carbon atoms is 6 or more.

Generally, in a case in which an alkylamine having a relatively low molecular weight is used within a range of the middle-chain alkylamine, since the vapor pressure of a protective film is high, and the film is easily removed, a tendency that the fine particles can be sintered at a lower temperature is exhibited, and, on the other hand, a tendency that the preserving property degrades is exhibited. In addition, a tendency that the affinity to an organic solvent degrades such that the fraction of the fine particles dispersible into a predetermined organic solvent decreases is exhibited. On the other hand, when an alkylamine having a relatively high molecular weight is used, a tendency that coated metal fine particles having a rigid protective film can be obtained is exhibited. In addition, since the dispersibility into a non-polar solvent increases, it becomes advantageous when the fine particles are dispersed in an organic solvent at a high fraction, and used as an ink.

In addition, as described above, in the invention, with respect to the long-chain or middle-chain alkylamine, a short-chain alkylamine is included in the amine mixture at a predetermined fraction. Generally, a tendency that the rate of forming a complex compound with the metal compound decreases as the alkyl chain in the alkylamine increases is exhibited, and it is observed that, in a case in which a long-chain alkylamine having approximately 18 carbon atoms is used, the formation of a complex compound is not completed even after long mixing. In contrast to this, when a short-chain alkylamine having 5 or less carbon atoms is mixed with the long-chain or middle-chain alkylamine at a predetermined fraction, then necessary time for forming a complex compound is shortened, and it becomes possible to favorably form a complex compound even in a case in which a long-chain alkylamine is used.

As such, when a short-chain alkylamine is mixed in the amine mixture, while the reason for promoting the formation of a complex compound with the metal compound is not clear, even with respect to the long-chain or middle-chain alkylamine, it becomes possible to form a favorable complex compound at a lower temperature within a short period of time, there is no particular limitation in the kinds of the long-chain or middle-chain alkylamine used, and it becomes possible to use an appropriate long-chain or middle-chain alkylamine depending on the expected characteristics of coated metal fine particles manufactured.

In addition, the complex compound formed in the presence of the short-chain alkylamine exhibits a tendency that the metal compound included in the composite compound is decomposed at a lower temperature in the subsequent heating and decomposition step. The reason for exhibiting the above tendency is not clear, but it is assumed to be that the presence of the short-chain alkylamine makes the alkylamine reliably form coordination bonds at a higher fraction with respect to the metal atoms included in the metal compound in the complex compound, and, consequently, the structure of the metal compound becomes unstable and is activated.

Furthermore, the coated metal fine particles manufactured using the amine mixture including the short-chain alkylamine at the predetermined fraction exhibit a tendency that, generally, the temperature necessary for sintering decreases. It is assumed that it is because, in a case in which the amine mixture including the short-chain alkylamine is used, the short-chain alkylamine is also included in coating portions of the manufactured coated metal fine particles, and has a higher vapor pressure than the long-chain or middle-chain alkylamine, and therefore it becomes easy for the films to be eliminated from the metal fine particles.

The effect obtained by mixing the above short-chain alkylamine with the amine mixture can be sufficiently obtained as long as the number of carbon atoms is 5 or less; however, even in the above range, the generation rate of the complex compound can be improved by using a alkylamine having a smaller number of carbon atoms and a lower molecular weight. Meanwhile, an alkylamine having a smaller number of carbon atoms and a higher vapor pressure exhibit a tendency that the evaporation amount increases during the decomposition of the metal compound or the preserving property of the manufactured coated metal fine particles degrades. Therefore, an alkylamine having approximately 3 to 4 carbon atoms is particularly desirably used, and can be used as the main component of the short-chain alkylamine. It is also possible to use a mixture of a plurality of kinds of the short-chain alkylamines as necessary.

As the short-chain alkylamine, amylamine (boiling point of 104° C.), 2-ethoxyethylamine (105° C.), 4-methoxybutylamine, diisopropylamine (84° C.), butylamine (78° C.), diethylamine (55° C.), propylamine (48° C.), isopropylamine (34° C.), ethylamine (17° C.), dimethylamine (7° C.) and the like are industrially available, and desirably used.

The content of the short-chain alkylamine in the amine mixture also changes depending on the kinds of the alkylamine used, but, when the content is set to approximately 10 mol % to 80 mol % with respect to the total alkylamines, it is possible to facilitate the generation of the composite compound between the alkylamine and the metal compound. Particularly, when the content is set to 25 mol % or more, the generation of the composite compound becomes sufficiently smooth, and it becomes possible to generate a composite compound for which a variety of long-chain or middle-chain alkylamines are used. On the other hand, when the content of the short-chain alkylamine in the amine mixture becomes 65 mol % or more, the manufactured coated metal fine particles become unstable, which is not desirable since long-term preservation becomes difficult. Furthermore, when the content of the short-chain alkylamine becomes 80 mol % or more, when silver fine particles are generated using the thermal decomposition of the complex compound, the agglomeration of silver atoms is not favorably controlled, and there is a problem in that large-sized particles are generated. When the content of the short-chain alkylamine in the amine mixture is set to approximately 30 mol % to 60 mol %, it becomes possible to stably hold the manufactured coated metal fine particles in an appropriate organic solvent for several months.

In addition, in the alkyldiamine having two amino groups with respect to the alkyl group, an effect of promoting the generation of the composite compound between the alkylamine and a silver-containing compound is observed since the alkyldiamine exhibits a higher polarity than an alkylamine having one amino group. However, in a case in which the generation of the composite compound is assisted mainly using an alkyldiamine, when the manufactured coated metal fine particles are sintered, a tendency that the residual electrical resistance is not easily decreased is exhibited. Therefore, in a case in which the short-chain alkyldiamine is included in the amine mixture and used, the fraction of the alkyldiamine in the amine mixture is desirably set to 10 mol % or less.

Additionally, water or alcohols of small molecules also have a strong polarity, and an effect of promoting the generation of the composite compound is observed, but water or alcohols of small molecules do not only increase the vapor pressure of the amine mixture but also influence the characteristics or yield of coated metal fine particles manufactured, and therefore it is not preferable to mix an excessive amount thereof into the amine mixture.

In addition, in the invention, as a dispersant for improving the dispersibility of coated silver fine particles into a dispersion medium, for example, a mixture of a fatty acid, such as oleic acid, with the amine mixture may be used. Particularly, in a case in which an amine mixture having an alkylamine with a low average molecular weight is used by the short-chain alkylamine being contained at a large fraction, or the like, it is effective to add an appropriate fatty acid. However, in a case in which an excessive amount of fatty acid is used, since a tendency that the elimination temperature of the protective coating from the coated silver fine particles increases is exhibited, the addition amount is desirably set to 5 mol % or less with respect to silver atoms included in the reaction system.

As described above, in the manufacturing method of coated metal fine particles according to the invention, the complex compound between the amine and the metal compound is generated by mixing a predetermined metal compound with the amine mixture containing the long-chain or middle-chain alkylamine as a component, and a predetermined amount of the short-chain alkylamine or other components. Thereby, it became possible to generate the complex compound of the metal compound and the amine within a short period of time of approximately 30 minutes to 60 minutes without causing a particular limitation in the kinds of the long-chain or middle-chain alkylamine used as the component, and it became possible to increase productivity when the coated metal fine particles are industrially manufactured. In addition, in a case in which stabilized coated metal fine particles having rigid coating or coated metal fine particles which had a high affinity to an organic solvent and could form a high-concentration dispersion solution were manufactured, it became possible to use the amine mixture including a lot of an appropriate long-chain alkylamine. Meanwhile, in a case in which coated metal fine particles having films that could be eliminated even at a low temperature of 100° C. or lower were a target, it became possible to use an amine mixture mainly including a middle-chain or short-chain alkylamine having a relatively low molecular weight.

In addition, even for alkylamines having the same number of carbon atoms, since the structure in the alkyl group portion causes differences in vapor pressure, affinity to organic solvents and the like, it becomes effective to use a mixture of a plurality of kinds of long-chain, middle-chain or short-chain alkylamines; however, in the manufacturing method according to the invention, since the components of the amine mixture can be selected from a wide range, it is possible to select the components of the amine mixture depending on the characteristics of the target coated metal fine particles. Particularly, there are cases in which a long-chain alkylamine having more than 12 carbon atoms does not flow at room temperature, and, in a case in which the alkylamine is used, it is necessary to supply fluidity by an alkylamine of a relatively small molecule or an organic solvent; however, when a short-chain alkylamine is mixed with the amine mixture using the invention, it becomes possible to use the above long-chain alkylamine.

The kind or content of the long-chain or middle-chain alkylamine and the short-chain alkylamine included in the amine mixture is desirably determined experimentally depending on the use or expected characteristics of coated metal fine particles manufactured. It is preferable that the amine mixture be sufficiently mixed into a uniform liquid-form matter, and then mixed with the metal compound.

Metal Compound as a Raw Material of Coated Metal Fine Particles

In a case in which coated metal fine particles are manufactured using the invention, a metal compound configured by bonding a metal and other atoms (or a group of atoms) is used as a supply source of metal atoms. The metal compound used in the invention is a compound that can generate a composite compound, such as a complex compound, with the amine, and any compound can be used as the metal source of the coated metal fine particles as long as the compound liberates and generates atomic metal at a temperature of approximately 300° C. or lower.

The metal compound that can generate the complex compound with the amine needs to have a space for the amine to be coordinated or the like around the metal atoms in the metal compound and not to cause the liberation and the like of the metal atoms due to a reaction, such as decomposition, when mixed with the amine. In addition, in the invention, it is desirable to appropriately select and use a compound for which the energy necessary to reduce and separate the metal atoms from the metal compound is small since the temperature when the coated metal fine particles are manufactured can be decreased, and the time for manufacturing can be shortened. In addition, in order to reduce impurities included in coated metal fine particles to be manufactured, a metal compound only containing target metal elements is desirably used.

The metal compound is not particularly limited, and it is advantageous to use metal salts between carboxylic acids and metals which are obtained by compounding carboxylic acids, such as formic acid, acetic acid, oxalic acid, malonic acid, benzoic acid or phthalic acid, in addition to a chloride, a nitrate, a carbonate or the like.

Particularly, in a case in which coated silver fine particles are manufactured, silver carboxylate, silver chloride, silver nitrate, silver carbonate or the like can be used, but silver oxalate is preferably used since metallic silver is easily generated through decomposition, and non-silver impurities are not easily generated. Silver oxalate is advantageous since the content ratio of silver is high, and oxalate ions are decomposed and removed as carbon dioxide through heating so that metallic silver is obtained through thermal decomposition without a reducing agent, and thus reducing agent-derived impurities and the like do not easily remain.

Meanwhile, the manufacturing method of coated metal fine particles according to the invention is not limited to the manufacturing of coated silver fine particles, and it is needless to say that the manufacturing method can be applied to the manufacturing of other metal fine particles that are manufactured using the metal amine complex decomposition method.

When the above-described amine mixture and the metal compound are mixed at a temperature at which a secondary reaction, such as decomposition reaction, of the metal compound is not caused, the complex compound between the metal compound and the amine is generated. Generally, when the complex compound is generated, since the complex compound exhibit a color determined by the components or the viscosity increases, it is preferable to sufficiently mix the amine mixture and the metal compound until the generation reaction of the complex compound does not cause a change in the mixture.

Formation of Metal Fine Particles Through Heating of Complex Compound

The complex compound between the metal compound and the amine, which is generated in the above manner, is heated so as to liberate the metal atoms in the metal compound, and the metal atoms are agglomerated, thereby forming metal fine particles. In a manufacturing process of coated metal fine particles using the metal amine complex decomposition method, since atomic metal is supplied by the thermal decomposition reaction of a single component (complex compound) generated in advance, it is assumed that, compared with a case in which atomic metal is supplied by a chemical reaction between a plurality of components, a variation in the reaction caused by the fluctuation or the like of the concentrations of the respective components is not easily caused, and metal fine particles having similar particle diameters can be stably manufactured. Therefore, the manufacturing of metal fine particles using the metal amine complex decomposition method is considered to be advantageous particularly in a large-scale industrial production process in which it is difficult to uniformly mix a plurality of components relating to a reaction.

In addition, in a case in which the metal compound made into the complex compound by the coordination bonding of the amine is heated, decomposed or the like under appropriate conditions so as to liberate atomic metal, it is assumed that amine molecules maintain the coordination bonds with respect to the liberated atomic metal through amino groups. Therefore, when the liberated atomic metals are mutually agglomerated so as to form an agglomerate, alkyl chains fixed by the c coordination bonds of the amino groups are present around the agglomerate at a high density so as to form a coating so that the growth of metal fine particles generated to a predetermined size or more is suppressed, and, consequently, it is assumed that, in coated metal fine particles manufactured using the metal amine complex decomposition method, fine metal particles having similar particle diameters can be stably manufactured.

In the metal amine complex decomposition method, since there is the mechanism that evens out the size of the metal fine particles generated in the above manner, the generation of large-sized particles is suppressed even in a state in which the metal atoms are present at a high concentration. As a result, compared with a method of the usual techniques in which fine particles were manufactured by maintaining the concentration of the metal atoms at a low level in a reaction system through dilution using a solvent, fine particles can be manufactured using a small amount of a solvent, and it is possible to maintain the yield of metal atoms collected as metal fine particles at an extremely high fraction of 95% or more.

The coated metal fine particles are desirably manufactured by heating the complex compound generated in the above manner in a reaction medium including an amine. That is, a complex compound obtained by mixing an excess amount of an amine or the like with the metal compound and a mixture of an amine or the like may be heated as they are, or it is also possible to produce a reaction medium by further mixing in an appropriate amine or the like as necessary. In addition, it is also possible to manufacture coated metal fine particles by separating the complex compound from a mixture including the generated complex compound using a method of centrifugal separation or the like, and then heating the complex compound in a state of being remixed with a reaction medium including an appropriate amine so as to manufacture coated metal fine particles, thereby substituting some of an amine that forms the complex compound by another amine.

The amount of the amine that forms the reaction medium when the complex compound is heated is preferably set to an amount at which coated metal fine particles generated are not exposed to the outside of the reaction medium. In a case in which coated metal fine particles generated are exposed to the outside of the reaction medium, there is a concern that a coating of metal fine particles with an amine may not be favorably formed. In addition, in a case in which an extremely excessive amount of the reaction medium is used, since the concentration of the metal atoms liberated from the complex compound decreases, the fraction of the metal atoms that do not agglomerate as metal particles increases so as to cause a decrease in the yield of metal collected as metal fine particles or the occurrence of a variation in the particle diameter of metal fine particles manufactured.

When the complex compound between the amine and the metal compound are heated in the reaction medium including an appropriate amine, atomic metal is liberated from the metal compound included in the complex compound. The reaction at this time may be a reaction that liberates metal atoms from the metal compound in the presence of an amine, and may be a reaction that liberates metal atoms by substituting metal atoms in the metal compound by appropriate atoms in addition to a reaction that liberates metal atoms by decomposing the metal compound.

The temperature at which the atomic metal is liberated from the complex compound varies depending on the kind of the complex compound used; however, in general, is preferably in a temperature range immediately above the temperature at which the liberation of the atomic metal begins. Meanwhile, in a case in which the complex compound is excessively heated, since the coordination bonds of the amine with respect to the metal easily break, the coating metal fine particles generated becomes unstable, and large-sized particles are likely to be generated, which is not preferable. In addition, the temperature at which the atomic metal is liberated from the complex compound is preferably as low a temperature as possible in a range in which the atomic metal is liberated since the amine and the like which form the reaction medium actively evaporate.

Particularly when silver fine particles are manufactured as the coated metal fine particles manufactured using the invention, silver oxalate is preferably used as the metal compound. Silver oxalate generally decomposes at approximately 200° C., and oxalate ions are removed as carbon dioxide so that metallic silver remains. Meanwhile, when the complex compound is produced using the amine mixture including a predetermined amount of the short-chain alkylamine and the method according to the invention, oxalate ions are thermally decomposed at a temperature of approximately 100° C. so that metallic silver can be liberated. Similarly to what has been described above, the temperature is desirably set to a low temperature in a range in which oxalate ions are thermally decomposed, but the thermal decomposition rate improves as the temperature increases, and therefore it is possible to appropriately increase the heating temperature in a range in which favorable metal fine particles can be obtained.

While the reason for the thermal decomposition temperature decreased by producing the complex compound using the amine mixture including the short-chain alkylamine as described above is not clear, it is assumed to be because the amine including the short-chain alkylamine favorably forms coordination bonds with respect to silver atoms in silver oxalate, and therefore the electronic state of the silver atoms is changed such that the structure of silver oxalate becomes unstable. In contrast to the above, according to the complex compound produced using an amine mixture mainly including a long-chain oleylamine described in Japanese Laid-Open Patent Publication No. 2008-214591, it becomes necessary to heat the complex compound to approximately 150° C. or higher in order to liberate metallic silver, and it is assumed that the coordination bonds of the amine are not always favorably formed.

When the metal fine particles are generated by liberating atomic metal from the complex compound, a reaction is preferably caused in an inert atmosphere, such as an Ar atmosphere, in order to prevent the oxidation or the like of metal fine particles generated or an amine which is a reaction medium. Meanwhile, in a case in which a metal salt of oxalic acid is used as the metal compound, since a reaction space is protected by carbon dioxide generated by the decomposition of oxalate ions through heating, metal fine particles can also be manufactured by heating the complex compound in the atmosphere.

The coated metal fine particles manufactured using the manufacturing method according to the invention have an average particle diameter of a maximum of approximately 30 nm, and, typically, the metal fine particles produced by coating the surfaces by coating mainly including amine molecules have an average particle diameter of 20 nm or less. In addition, the amine molecules that form the coating are assumed to bond to the surfaces of the metal fine particles through a relatively weak force generated by bonds that do not accompany the trade of charges (coordinate bonds) using the amino groups, and it is assumed that the coordinate bonds of the amine molecules that form the coating are easily broken due to heating or the like such that the surfaces of the metal fine particles are exposed, whereby sintering at a low temperature can occur.

In the coated metal fine particles manufactured using the manufacturing method according to the invention, generally, the weight of the coated portions is desirably set to 20 weight % or less of the total. It is because, when the weight fraction of the coating portions becomes large, a longer period of time is required to sinter the coated metal fine particles, and the alkylamine and the like remain in the sintered metal film such that it becomes difficult to decrease the volume resistance. In addition, in a case in which the main component of the metal fine particles is a metal that is easily oxidized, such as copper, the weight fraction of the coated portions is preferably set to 10 weight % or more in order to prevent the oxidation of the fine particles. Meanwhile, in a case in which the main component of the metal fine particles is a metal that is not easily oxidized, such as silver, the weight fraction of the coated portions may be a degree at which dispersion into an appropriate solvent is possible, and can be set to 10 weight % or less. Particularly, when the weight fraction is set to 7 weight % or less, smooth sintering at near room temperature becomes possible.

As described above, the coating portions of the coated metal fine particles manufactured using the manufacturing method according to the invention are considered to be formed by a number of alkylamine molecules bonded to metal fine particles using the coordination bonds of the amino groups, and the alkyl group portions agglomerated on the surfaces of the metal fine particles. Therefore, the weight fraction of the coated portions can be adjusted by adjusting the molecular weight of the mainly used alkylamine.

The coated metal fine particles manufactured in the above manner are used in an appropriate aspect depending on the characteristics or use thereof. For example, in a case in which the coated metal fine particles are applied in a predetermined shape using ink jet or the like so as to form a metal film using low-temperature sintering, the coating of the coated metal fine particles is desirably stored and used in a state in which the coating is not easily removed by substituting the amine used as the reaction medium by a desired organic solvent so as to produce an ink-form dispersion solution containing the coated metal fine particles dispersed in an organic solvent. In addition, in the case of coated metal fine particles provided with a coating mainly including a relatively long-chain alkylamine, the coated metal fine particles can be stored as a powder-form matter from which the amine used as the reaction medium has been removed. The coated metal fine particles from which the amine has been removed can be dispersed in an appropriate organic solvent or used in a paste form.

As described above, in the coated metal fine particles manufactured using the manufacturing method according to the invention, it is assumed that the coordinate bonds between the amine molecules that form the coating and the metal particles or the agglomeration of the amine molecules are broken due to heating or the like so as to remove the coating so that the metal fine particles come into direct contact with each other, whereby sintering at a low temperature occurs using the surface energy as a driving force. Means for removing the coating of the coated metal fine particles is not limited to heat energy by heating, and the coating of the coated metal fine particles can be easily removed using, for example, light excitation by ultraviolet rays or the like, removal of the coating using a mechanical action, removal of the coating using a chemical reaction or the like, whereby the metal fine particles can be sintered.

In a case in which, particularly, coated silver fine particles are manufactured using the manufacturing method of coated metal fine particles according to the invention, it becomes possible to obtain coated silver fine particles having characteristics not possessed by silver fine particles of the usual techniques. Since metallic silver has a high electrical conductivity, and is not oxidized even in the atmosphere, even in a case in which the fine particles are used as a thin film-form wire formed by sintering the fine particles applied on the surface or the like of a substrate through printing, an increase in the resistance value caused by oxidation or the like is not easily caused, and the wire stably functions, which is preferable. In addition, since silver atoms have a high self-diffusion coefficient, sintering can be expected at a lower temperature than for other metals, and therefore the coated silver fine particles have preferable characteristics as a material that forms wires on a resin substrate.

Similarly to what has been described above in the manufacturing process of coated metal fine particles, in the step of manufacturing coated silver fine particles, when a complex compound including a silver-containing compound containing silver and amines is generated, it is possible to facilitate the generation of the complex compound by a short-chain alkylamine being contained in the amine mixture mixed with the silver-containing compound at a predetermined fraction, there is no particular limitation in the long-chain or middle-chain alkylamine which is a component, and it becomes possible to generate the complex compound within a short period of time. In addition, the action of the short-chain alkylamine in the amine mixture decreases the temperature necessary for the liberation of silver atoms from the generated complex compound, and it becomes possible to manufacture coated silver fine particles at a lower temperature than in a related art.

In addition to the above effects, when the amine mixture containing the short-chain alkylamine at a predetermined fraction was used, it was possible to further decrease the sintering temperature of the manufactured coated silver fine particles compared with fine particles of the usual techniques, and, when an appropriate amine was selected as the amine that formed the coating, self-sintering occurred even at room temperature, without any heating, so that it became possible to manufacture coated silver fine particles exhibiting metallic luster.

Although the reason for the sintering temperature of the coated silver fine particles manufactured using the manufacturing method of coated metal fine particles according to the invention significantly decreasing as described above is not clear, it is assumed to be because, in coated silver fine particles manufactured using the amine mixture containing the short-chain alkylamine at a predetermined fraction, the short-chain alkylamine is included in the coating, and a high vapor pressure causes the coating to be more easily eliminated or removed from silver fine particles.

The coated silver fine particles can be stably dispersed at a high concentration in an appropriate organic solvent, such as an alcohol solvent such as butanol, a non-polar solvent such as octane or a solvent mixture thereof, and, when the dispersion solution is applied on a substrate, the coating of the coated silver fine particles is eliminated after the organic solvent is evaporated. According to the coated silver fine particles, since it becomes possible to form a metallic silver film at an extremely low temperature near room temperature, it becomes possible to easily form a conductive film and a conductive wire on a poorly heat-resistant plastic substrate, and it becomes possible to easily supply electrical conductivity to a poorly environment-resistant substance, such as fabric or paper.

Hereinafter, the invention will be specifically described using the manufacturing of coated silver fine particles as coated metal fine particles as an example. In the following description, a case in which silver oxalate is used as a silver-containing compound which serves as a supply source of silver that constitutes silver fine particles will be described. Meanwhile, when a predetermined amount of predetermined additional components (for example, copper oxalate and the like) are mixed with silver oxalate, coated silver fine particles containing the additional components can be also manufactured. Examples of the coated silver fine particles in the invention also include metal fine particles containing other metal elements and the like in addition to silver as the main component.

Industrially available silver oxalate has a white powder form, and, when used in generating the complex compound with the amine in the invention, it is desirable that silver oxalate be finely pulverized in advance so as to increase the specific surface area and improve the reactivity with the amine. The amine mixture used in the generation of the complex compound is desirably produced as an entirely uniform mixture by mixing a short-chain alkylamine with an appropriate mixture of a long-chain or middle-chain alkylamine selected depending on the use and the like of coated silver fine particles to be manufactured. In addition, at this time, in a case in which the amine mixture has a high viscosity and a low fluidity, it is desirable to appropriately mix in an alcohol or water as long as the subsequent reactions are not inhibited, thereby producing a mixture having a sufficient fluidity.

Next, the silver oxalate powder and the amine mixture are mixed so that, generally, the molar ratio between silver atoms included in the silver oxalate and the total amount of the amine becomes approximately 1:1 to 1:5, and, typically, stirred at a temperature near room temperature for approximately 30 minutes to 60 minutes, thereby generating a complex compound of the silver oxalate and the amine, and changing the complex compound into a white fluidic substance having a high viscosity. At this time, when the fraction of the short-chain alkylamine included in the amine mixture is 10 mol % or less, generally, the generation of the complex compound takes a long time, and there are cases in which the generation of the complex compound becomes difficult depending on the kind of the long-chain or middle-chain alkylamine used. In addition, when the fraction is 25 mol % or more, the complex compound can be favorably generated regardless of the kind of the long-chain or middle-chain alkylamine used, and, particularly when the fraction is set to 30 mol % or more, it is possible to generate the complex compound within a short period of time of approximately 30 minutes. Meanwhile, in coated silver fine particles manufactured using a complex compound generated using an excessive amount of the short-chain alkylamine, since a tendency of the film becoming unstable is exhibited such that stable storage or use becomes difficult, generally, the fraction of the short-chain alkylamine included in the amine mixture is preferably set to 80 mol % or less.

Next, when the complex compound between the above-obtained silver oxalate and the amine is heated under stirring in a reaction medium mainly including an amine, carbon dioxide bubbles are generated so as to form a suspension exhibiting blue luster, and, when excess amine and the like are removed from the suspension, coated silver fine particles according to the invention can be obtained. In a step of generating the coated silver fine particles, it is considered that, when the complex compound of the silver oxalate and the amine is heated, oxalate ions are thermally decomposed and eliminated as carbon dioxide while the coordinate bonds of the amine with respect to the silver atoms are maintained, the metallic silver with an amine coordinated therearound is generated, and then the silver atoms are agglomerated so as to obtain coated silver fine particles coated with an amine protective coating.

The heating temperature of the complex compound of the silver oxalate and the amine is preferably as low a temperature as possible as long as the coated silver fine particles are generated; however, when the amine mixture used in generating the complex compound includes an appropriate amount of the short-chain alkylamine, heating to approximately 100° C. begins to decompose the oxalate ions, whereby coated silver fine particles can be obtained. Meanwhile, generally, while silver oxalate decomposes at approximately 200° C., the reason for the thermal decomposition temperature decreasing by 100° C. or more due to the formation of the complex compound is not clear, but it is assumed that it is because the short-chain alkylamine is present when the complex compound is generated, the coordination polymer structure formed of pure silver oxalate is broken, and the structure of the silver oxalate becomes unstable.

In addition, for generating the coated silver fine particles by heating the complex compound, the silver compound is preferably thermally decomposed in an inert atmosphere, such as an Ar atmosphere; however, in a case in which silver oxalate is used, since a reaction space is protected by carbon dioxide generated by the decomposition of oxalate ions, it is possible to manufacture coated silver fine particles even in the atmosphere.

The sinterability at a low temperature of the coated silver fine particles generated can be evaluated by measuring the degree of weight decrease when the coated silver fine particles are heated in an air flow. It is because, in the coated silver fine particles according to the invention, when amine molecules that bond to silver fine particles through coordinate bonds so as to form a coating are eliminated through heating or the like, the clean surfaces of the silver fine particles are exposed and come into contact with each other so as to be sintered, and therefore low-temperature sintering occurs in coated silver fine particles having a coating that is eliminated at a lower temperature.

As described in the following examples, in a case in which coated silver fine particles manufactured using the amine mixture including the short-chain alkylamine are used, and an organic solvent and the like which suspend or disperse the coated silver fine particles are removed so that the coated silver fine particles are exposed to the atmosphere, it is observed that remarkable weight decrease is also caused during heating at 100° C. or lower, and the fine particles are sintered so that a conductive silver film exhibiting silver color is formed. As such, the reason for the formation of a coating that can be eliminated at an extremely low temperature on the coated silver fine particles according to the invention is assumed to be because the short-chain alkylamine included in the coating of the coated silver fine particles breaks the coordinate bonds with the silver fine particles even at a low temperature using a higher vapor pressure than that of the long-chain or middle-chain alkylamine and the detachment of the short-chain alkylamine weakens the cohesion force between the amine molecules in the coating, and because the detachment of the long-chain or middle-chain alkylamine is promoted.

As described above, according to the manufacturing method of coated metal fine particles according to the invention, in the metal amine complex decomposition method, when the amine mixture for generating the complex compound contains a predetermined amount of the short-chain alkylamine, there is no particular limitation in other alkylamines included in the amine mixture, and it becomes possible to generate the complex compound within a short period of time. In addition, since the complex compound is decomposed at a lower temperature than in the related art, it becomes possible to stably manufacture coated metal fine particles.

Furthermore, in the silver fine particles manufactured using the manufacturing method of coated metal fine particles according to the invention, since the coating can be easily eliminated at a lower temperature than in the related art, it becomes possible to form a conductive silver film exhibiting silver luster even at a temperature near room temperature.

Hereinafter, the invention will be specifically described with reference to examples.

Examples 1 to 4

Coated silver fine particles according to Examples 1 to 4 were manufactured in the following manner based on the conditions described in Table 1. That is, oleylamine (Kao, FAMINE O, the number of carbon atoms: 18) as a long-chain alkylamine, octylamine (Kao, FAMINE 08D, the number of carbon atoms: 8) and hexylamine (Kanto Chemical Co., Inc., special grade, the number of carbon atoms: 6) as middle-chain alkylamines and butylamine (Kanto Chemical Co., Inc., special grade, the number of carbon atoms: 4) as a short-chain alkylamine were mixed at the fractions described in Table 1, thereby generating an amine liquid mixture. In Table 1, the values described in parentheses beside the amounts of the respective amines (g) indicate the molar amounts (molar ratios) of the respective alkylamines with respect to 1 mole of silver oxalate ($Ag_2C_2O_4$) used below. In addition, in Examples 1 and 4, oleic acid (Tokyo Chemical Industry Co., Ltd., >85%) which is a fatty acid was mixed with the amine mixtures at the fractions described in Table 1. The liquid mixtures of the generated alkylamines were all uniform liquid matters at room temperature.

TABLE 1

|  | Alkylamine | | | | | | |
|---|---|---|---|---|---|---|---|
|  | Long-chain (g) | Middle-chain (g) | | Short-chain (g) | Total molar weight of | Oleic acid | Silver oxalate |
|  | Oleylamine $C_{18}H_{37}N$ | Octylamine $C_8H_{19}N$ | Hexylamine $C_6H_{15}N$ | Butylamine $C_4H_{11}N$ | alkylamine with respect to silver oxalate (times) | (g) | (g) |
| Example 1 |  | 0.73 (0.56) | 3.46 (3.4) | 1.45 (2.0) | 6.0 | 0.12 | 3.047 (1) |
| Example 2 | 0.164 (0.18) | 0.396 (0.92) | 0.549 (1.6) | 0.737 (3.0) | 5.7 |  | 1.010 (1) |
| Example 3 | 5.36 (4.0) |  |  | 0.755 (2.1) | 6.1 |  | 1.523 (1) |
| Example 4 | 5.36 (4.0) |  |  | 0.737 (2.0) | 6.0 | 0.085 | 1.527 (1) |
| Comparative Example 1 |  | 0.73 (0.56) | 3.45 (3.4) |  | 4.0 | 0.11 | 3.047 (1) |
| Comparative Example 2 | 5.36 (4.0) |  |  |  | 4.0 |  | 1.522 (1) |

Silver oxalate obtained by synthesizing from silver nitrate (Kanto Chemical Co., Inc., extra-pure grade) and oxalic acid dihydrate (Kanto Chemical Co., Inc., guaranteed grade) was added to the above-generated respective amine liquid mixtures at the fractions described in Table 1. In the present examples, silver oxalate was added so that the molar number of the alkylamine in the amine mixture became approximately 4 times to 6 times the molar amount of silver oxalate. Since two silver atoms are present in a silver oxalate molecule, the amount of the alkylamine was equivalent to twice to three times the molar amount of silver atoms. After injection of silver oxalate, silver oxalate was stirred at room temperature so as to be changed into a white viscous substance, and, when it was recognized that the silver oxalate was, apparently, completely changed, the stirring was ended.

As a result of separating and removing unreacted alkylamines which were not bonded to the white substance by adding diethyl ether in which the alkylamines could be dissolved, and then measuring the IR spectrum of the remaining white substance, absorption of the alkylamine by alkyl chains was observed, which indicated that the above-obtained white substance was a substance formed by bonding the silver oxalate and the alkylamine. It was assumed that the white substance was a complex compound formed of amino groups of the alkylamine which were coordinately bonded to the silver atoms in the silver oxalate.

Next, the obtained liquid mixture was moved into an aluminum block-type heating and stirring machine (Koike Precision Instruments), and heated and stirred at a set temperature of 100° C. to 110° C. Immediately after the beginning of stirring, a reaction accompanying the generation of carbon dioxide began, and then the liquid mixture was stirred until generation of carbon dioxide was completed, thereby obtaining a suspension in which silver fine particles exhibiting blue luster were suspended in the amine mixture.

Next, in order to substitute the dispersion medium of the suspension, methanol (Kanto Chemical Co., Inc., extra-pure grade) 10 mL was added, the mixture was stirred, then, silver fine particles were precipitated and separated using centrifugal separation, methanol (10 mL) was added again to the separated silver fine particles, and the mixture was stirred and centrifugally separated, thereby precipitating and separating the silver fine particles. A solvent mixture (volume ratio 1:4) of butanol (Kanto Chemical Co., Inc., guaranteed grade) and octane (GORDO) was added to the silver fine particles so that the content ratio of silver after mixing became approximately 30 weight % to 50 weight %, and the mixture was stirred, and, furthermore, centrifugally separated as necessary so as to remove particle components lacking dispersibility, thereby obtaining a dispersion solution in which dark yellow orange coated silver fine particles were independently dispersed. The dark yellow orange color indicates a metallic silver-caused surface plasmon band having a maximum wavelength of approximately 396 nm, which is caused by the fact that, in the manufactured coated silver fine particles, the surface atoms of the silver fine particles do not form a compound or the like, and stay in a metal state, and indicates that nano-sized silver fine particles are independently dispersed in a solvent.

Comparative Example 1

In Comparative Example 1, a dispersion solution of coated silver fine particles was manufactured in the same manner as in Example 1 except that butylamine which was a short-chain alkylamine was not used.

Comparative Example 2

In Comparative Example 2, the manufacturing of a dispersion solution of coated silver fine particles was attempted in the same manner as in Example 3 except that butylamine which was a short-chain alkylamine was not used. As a result, it became clear that no change was observed in silver oxalate simply when the silver oxalate was stirred for 2 hours at room temperature, and, in a case in which the short-chain alkylamine was not present, the reactivity between the silver oxalate and the oleylamine which was a long-chain alkylamine was insufficient, and the generation of the complex compound was difficult.

Furthermore, the mixture of silver oxalate and oleylamine which had been stirred at room temperature for 2 hours was moved into an aluminum block-type heating and stirring machine having a set temperature of 100° C. to 110° C. and stirred, but no particular change was observed. Therefore, as a result of gradually increasing the set temperature up to 170° C. and heating and stirring the mixture for 2 hours or more, it was observed that carbon dioxide was slightly generated and the mixture was changed to be brownish. The change was considered to result from the fact that, while silver fine particles were partially generated, the decomposition of silver oxalate did not completely proceed such that favorable silver fine particles were not obtained.

Evaluation Result 1

For the dispersion solutions of coated silver fine particles manufactured in Examples 1 to 4 and Comparative Example 1, the necessary times for generating the complex compounds at room temperature and the necessary times for decomposing the complex compounds at the set temperatures of 100° C. to 110° C. so as to generate silver fine particles when manufacturing the fine particles are described in Table 2.

TABLE 2

| | Generation time of complex [room temperature] | Decomposition of complex compound [at 100° C. to 110° C.] | Silver-based Yield | Weight fraction of silver in dispersion solution (wt %) | Particle diameter of coated silver fine particles (nm) |
|---|---|---|---|---|---|
| Example 1 | 35 minutes | 10 minutes | 83% | 44 | 10 to 20 (DLS: 14 nm) |
| Example 2 | 30 minutes | 20 minutes | 96% | 29 | To 20 (DLS: 18 nm) |
| Example 3 | 120 minutes | 20 minutes | 97% | 54 | 10 to 20 |
| Example 4 | 120 minutes | 20 minutes | 76% | 53 | 10 to 20 |

TABLE 2-continued

|  | Generation time of complex [room temperature] | Decomposition of complex compound [at 100° C. to 110° C.] | Silver-based Yield | Weight fraction of silver in dispersion solution (wt %) | Particle diameter of coated silver fine particles (nm) |
| --- | --- | --- | --- | --- | --- |
| Comparative Example 1 | 200 minutes | 20 minutes | 54% | 33 | 10 to 20 |
| Comparative Example 2 | (120 minutes) | — | — | — | — |

DLS: Dynamic Light Scattering Particle Size Distribution (number average particle diameter).

As described in Table 2, in Examples 1 to 4 in which the short-chain alkylamine (butylamine) was included in the amine mixture, the generation of the complex compound is completed after approximately 120 minutes even in a case in which the long-chain alkylamine (oleylamine) is included as the main component. In contrast to this, in a case in which the short-chain alkylamine is not included, even in a case in which an amine having a relatively low molecular weight is used (Comparative Example 1), approximately 200 minutes becomes required in order to complete the generation of the complex compound. Furthermore, in a case in which the long-chain alkylamine is included as the main component (Comparative Example 2), the complex compound is not substantially generated as described above.

From the above results, it is clear that, when the complex compound with silver oxalate is generated in the amine mixture, the complex compound can be smoothly generated by mixing the short-chain alkylamine with the amine mixture.

Evaluation Result 2

The weights of metallic silver included in the respective dispersion solutions of the coated silver fine particles manufactured using the methods described in Examples 1 to 4 and Comparative Example 1 were measured by heating the respective dispersion solutions in a thermogravimetric analyzer (Shimadzu, TGA-50), and completely removing the dispersion medium and the coated portions of the coated silver fine particles. The ratios of the measured weights of the metallic silver to the weights of the silver included in the silver oxalate used during the manufacturing were described in Table 2 as "silver-based yield". In addition, Table 2 collectively described "the weight fraction of silver in the dispersion solution used in the measurement" which was converted using the measured metal silver weight.

As described in Table 2, in Example 1 in which the short-chain alkylamine was included in the amine mixture, compared with Comparative Example 1 in which the short-chain alkylamine was not included, which was the only difference from Example 1, it is found that "silver-based yield" significantly improves. This is considered to be because the presence of the short-chain alkylamine promotes the generation of the complex compound, and the fraction of the silver atoms in the silver oxalate which do not form the complex compound decreases, whereby the collection rate of silver atoms improves. In addition, in a case in which oleic acid is not mixed with the amine mixture, since silver atoms included in silver oxalate which is a raw material can be collected at an extremely high fraction of 96% to 97%, it is expected that coated silver fine particles will be able to be manufactured at a low cost in a practical production process.

In addition, as described in Table 2, it is found that the coated silver fine particles according to the invention can be dispersed in a solvent mixture at a high concentration of 50 wt % or more in terms of the weight fraction of silver even when 30% or more of butylamine which is a short-chain alkylamine is included in the amine mixture.

Evaluation Result 3

The dispersion solutions of the coated silver fine particles manufactured using the methods described in Examples 1 to 3 and Comparative Example 1 were diluted, added dropwise to a collodion film (copper mesh grid, for transmission electron microscope), washed using methanol, and then observed using a scanning electron microscope (JEOL, JSM-6510 ($LaB_6$ electron gun)). The results are illustrated in FIG. 1. The coated silver fine particles manufactured using the methods were all observed as approximately 10 nm to 20 nm-sized spherical particles on the collodion film.

In addition, as a result of measuring the dynamic light scattering particle size distribution (Otsuka Electronics Co., Ltd., ELS-Z2M) of the coated silver fine particles manufactured using the methods described in Examples 1 and 2, it was indicated that the coated silver fine particles were independently dispersed in each of them and the number average particle diameters were approximately 14 nm and 18 nm respectively (Table 2).

Evaluation Result 4

The weight changes when the coated silver fine particles manufactured using the methods described in Examples 1 and 2 and Comparative Example 1 were heated in a thermogravimetric analyzer are illustrated in FIG. 2. For evaluation, the synthesized coated silver fine particles were dispersed in methanol which was a centrifugal separation solvent, centrifugally separated, then, the methanol was evaporated from the extracted coated silver fine particles in the thermogravimetric analyzer at room temperature, when the weight decrease was completed was considered as a beginning point, and the weight changes were measured under a synthetic air flow (30 mL per minute) in a process of increasing temperature in increments of 10° C. per minute from room temperature.

In all the evaluated coated silver fine particles, a pattern in which the weights were decreased as the temperature increased and then became constant at approximately 250° C. was observed. In addition, the weights were all observed to be decreased in a two-step process, and it was observed that a large weight decreasing of drop was shown between 100° C. and 150° C., and, subsequently, the weight was decreased. In addition, it was observed that the weight became constant at approximately 92% to 95% of the weight before the beginning of temperature increase by heating to 250° C. or higher.

The weight decreasing of drop observed in the process of temperature increase from room temperature is considered to be caused by the evaporation elimination of the alkylamine and the like that form the coating of the coated silver fine particles, and the weight remaining at 250° C. or lower corresponds to the metallic silver after the alkylamine that forms the coating is eliminated. That is, in the coated silver fine particles according to the invention, approximately 5 weight % to 8 weight % of the total weight corresponds to the weight of the coated portions.

In addition, the pattern of the weight decreasing of drop changes depending on the composition or the like of the amine mixture used when the coated silver fine particles are manufactured. That is, in Example 1 in which an alkylamine having a relatively high vapor pressure was used, it is found that the alkylamine that forms the coating is drastically eliminated from approximately 100° C. In contrast to this, in Example 2 in which the amine mixture including the long-chain alkylamine was used, it is found that the weight decreasing of drop was slow between 100° C. and 150° C., and the alkylamine that forms the coating remained at a higher temperature. Meanwhile, in Comparative Example 1, compared with Examples 1 and 2 which included the short-chain alkylamine, the weight of the coating was approximately 1.5 times, and a tendency that the alkylamine that forms the coating remained at a high temperature although the long-chain alkylamine was not included was exhibited, and therefore it was assumed that the structures of the coatings were different.

In order to evaluate the ease of the elimination of the coatings on the coated silver fine particles, in the weight change during the temperature increase illustrated in FIG. 2, the elimination rate at 160° C. of the coating after the initial large weight decreasing of drop occurred was evaluated. The results are collectively described in Table 3. As described in Table 3, in Example 1, 70% of the total coating amount has already been eliminated at 160° C. In addition, it is found that, even in Example 2 which includes the long-chain alkylamine, 50% of the total coating amount is eliminated. In contrast to this, in Comparative Example 1 in which the amine liquid mixture having the same composition as in Example 1 except that the short-chain alkylamine is not used is used, it is found that the elimination at 160° C. of the coating is approximately 46%, and the elimination is not satisfied even in Example 2 which include the long-chain alkylamine. It is also found from the above results that the short-chain alkylamine in the amine liquid mixture contributes to the formation of the coating that is favorably easily eliminated.

Evaluation Result 5

The mass analysis results of gas components discharged from the coated silver fine particles when the coated silver fine particles manufactured using the method described in Example 1 were heated in a thermogravimetric analyzer built in a mass analysis apparatus are illustrated in FIG. 3. For evaluation, methanol in the coated silver fine particles, from which methanol had been centrifugally separated, was evaporated in a simultaneous thermogravimetric differential analysis photoionization mass spectrometer (RIGAKU Thermo Mass/Photo), when the weight decreasing of drop was completed was considered as a beginning point, and the discharge amount of a gas type discharged in a process of increasing the temperature in increments of 20° C. from room temperature for each molecular weight was measured under a helium gas flow (300 mL per minute).

As a result, it was found that butylamine (m/z 73) having a low molecular weight, hexylamine (m/z 101) and octylamine (m/z 129) were eliminated in this order as the temperature increased. Particularly, butylamine begins to be eliminated during heating at a low temperature of 30° C. immediately after the beginning of the heating, and the elimination of butylamine is dominant in a heating area of 100° C. or lower. In addition, it is found that butylamine, hexylamine and octylamine are cooperatively eliminated at near 150° C. Meanwhile, for comparison, as a result of performing the same evaluation on the coated silver fine particles manufactured in Comparative Example 1, a tendency that the elimination of hexylamine and octylamine began to shift to the high temperature side compared with Example 1 was observed.

It was observed from the above facts that, in the invention, when the coated silver fine particles were manufactured by mixing the short-chain alkylamine with the amine mixture, the short-chain alkylamines were present in the coating of the silver fine particles, and were relatively easily eliminated from the coating even at a low temperature, thereby assisting the cooperative elimination of the middle-chain alkylamines having a relatively high molecular weight from the coating which had become loose and thus unstable.

Evaluation Result 6

Figure 4:
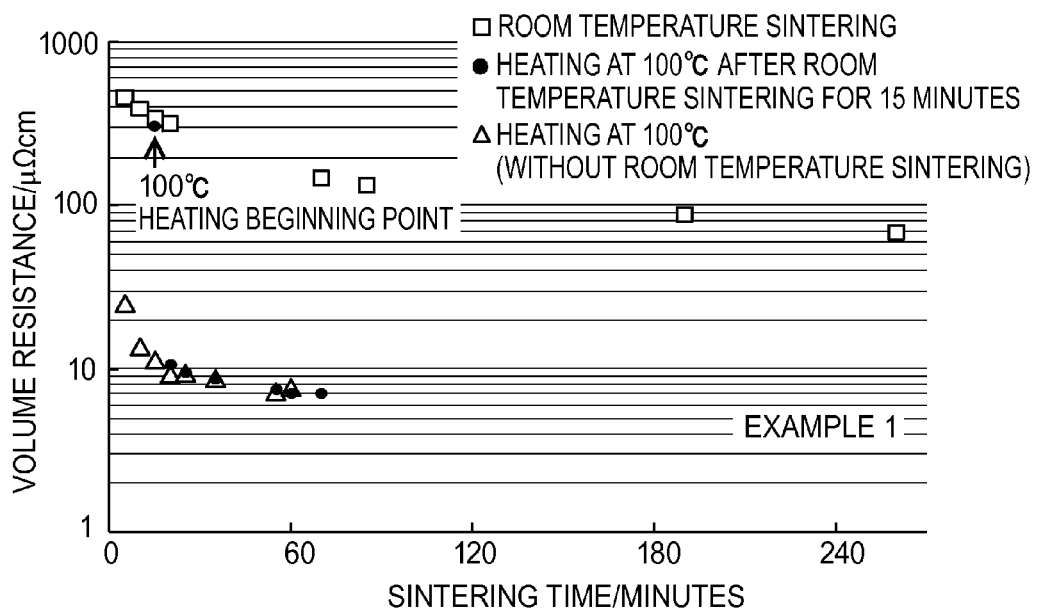
FIG. 4 is a view illustrating a change in a volume resistance when coated silver fine particles (Example 1) manufactured using the invention are applied on a substrate.
Figure 5:
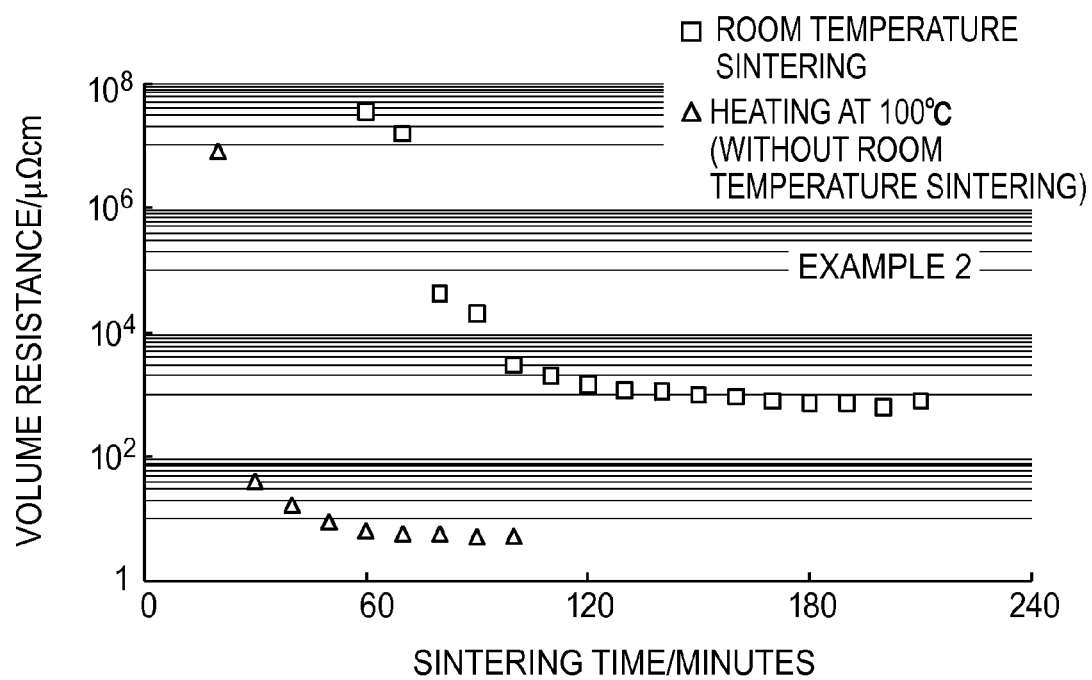
FIG. 5 is a view illustrating a change in a volume resistance when coated silver fine particles (Example 2) manufactured using the invention are applied on a substrate.

The evaluation results of the sinterability of the dispersion solutions of coated silver fine particles manufactured using the methods described in Examples 1 and 2 and Comparative Example 1 when applied and sintered on a substrate are illustrated in FIGS. 4 to 6. The sinterability was evaluated by applying each of the dispersion solutions on a polyester film substrate (OHP sheet) using spin coating, being left to stand at room temperature (A) and heated to 100° C. (B), and measuring the change in the volume resistance at this time using a four probe method (Kyowariken Co., Ltd., K-705RS). In addition, for the dispersion solution manufactured in Example 1, a test in which the dispersion solution was left to stand for 15 minutes at room temperature after spin coating and then heated to 100° C. (C) was performed.

In the dispersion solution manufactured in Example 1 (FIG. 4), an drastic decreasing of drop of the volume resistance value occurred within 1 hour from spin coating even at room temperature, and, even afterwards, the volume resistance value slowly reduced so as to reach 20 μΩcm after being left to stand for 1 day. In addition, it became clear that the applied film exhibited silver luster after the resistance became low and the coated silver fine particles were sintered even at room temperature so as to form a metallic silver film. Meanwhile, in a case in which the applied film was heated to 100° C., regardless of whether or not the applied film was left to stand at room temperature after spin coating, the volume resistance drastically deceased or dropped for approximately 10 minutes, and decreased to 7 μΩcm to 8 μΩcm within 60 minutes. In addition, even in this case, it became clear that the applied film exhibited metal luster after the resistance decreased, and the coated silver fine particles were sintered so as to form a metallic silver film.

In a case in which the inventors tried to obtain the same silver film having a high conductivity of approximately 10 μΩcm as that described above by sintering coated silver fine particles manufactured using the alkyldiamine disclosed in Japanese Laid-Open Patent Publication No. 2008-214695 at approximately 100° C., it was necessary to hold the applied film of the coated silver fine particles at room temperature for approximately 1 hour to 3 hours before heating the film. In contrast to this, in the coated silver fine particles manufactured using the short-chain alkylamine in the invention, as described above, it became possible to obtain a silver film having a low resistance with no necessity of holding the film at room temperature before heating.

Even in the dispersion solution manufactured in Example 2 (FIG. 5), the same tendency as in Example 1 was observed, and the silver fine particles were sintered even at room temperature so as to easily generate a conductive metallic silver film; however, particularly, in a case in which the applied film was sintered at room temperature, a tendency of the volume resistance remaining at approximately 1000 μΩcm was exhibited. It was assumed to be because the long-chain alkylamine used during the manufacturing remained among the silver particles in the sintered film. Meanwhile, in a case in which the film was heated to 100° C., a silver film exhibiting almost the same low residual resistance value as in Example 1 could be formed. As described in Table 2 and the like, it is possible to maintain the yield of silver at an extremely high level when manufacturing the coated silver fine particles from silver oxalate by using an appropriate amount of the long-chain alkylamine. In addition, for example, there are cases in which silver oxalate is violently decomposed so that the reaction temperature locally increases, the stability of the reaction is increased by using an alkylamine having a high boiling point, and the exposure and the like of silver oxalate can be prevented. In consideration of the above fact, the kind, fraction and the like of the long-chain or middle-chain alkylamine in the amine mixture are appropriately determined depending on the use and the like of the coated silver fine particles being manufactured.

Meanwhile, in a case in which a dispersion solution manufactured without using the short-chain alkylamine was applied as Comparative Example 1 (FIG. 6), when the dispersion solution was heated to 100° C., the fine particles were sintered so that approximately the same volume resistance as in Example 1 was exhibited; however, a tendency that a longer period of time became necessary for sintering compared with in Example 1 was exhibited. In addition, the resistance value after application was not easily decreased at room temperature, a volume resistance of approximately 105 μΩcm remained even after a long period of time elapsed, and a strong tendency that the alkylamine remained among silver particles in the silver film was exhibited. In Comparative Example 1, the reason for the above result regardless of the use of the middle-chain alkylamine having a relatively high vapor pressure was assumed to be because the coating of the silver fine particles did not include the short-chain alkylamine such that the evaporation of the short-chain alkylamine could not be used, and the promotion of evaporation of the middle-chain alkylamine by the evaporation of the short-chain alkylamine did not function.

Table 3 describes the elimination rates of the coatings when heated up to 160° C. in the thermogravimetric analyzer, which were evaluated in Evaluation Result 4, and the volume resistance values remaining when sintering the coated silver fine particles, which were evaluated in Evaluation Result 6, of the coated silver fine particles manufactured using the methods described in Examples 1 and 2 and Comparative Example 1. As described in Table 3, in a case in which the same alkylamine was used in order to form the coating of the silver fine particles (Example 1 and Comparative Example 1), since the elimination rates of the coatings were high when the films were heated to approximately 160° C., a tendency of the sinterability improving particularly at room temperature was observed. It is understood to be because the sintering among the silver fine particles was suppressed by the coatings of the coated silver fine particles so that the silver fine particles were stably held, and the silver fine particles were favorably sintered at room temperature by selecting alkylamines that were rapidly evaporated and removed when the dispersion medium was removed.

TABLE 3

| | Elimination rate of coating [at 160° C.] | Volume resistance value after sintering (μΩcm) | |
|---|---|---|---|
| | | Room temperature sintering | Sintering at 100° C. |
| Example 1 | 70% | 20 | 7 |
| Example 2 | 51% | 1000 | 8 |
| Comparative Example 1 | 46% | 105 | 8 |

According to the short-chain alkylamine used in the invention, it is made possible for a complex compound to be smoothly generated when coated metal fine particles are manufactured in a metal amine complex decomposition method, and it becomes possible to form a coat that can be extremely easily eliminated from the manufactured coated metal fine particles.

It should also be understood that many modifications and variations of the described embodiments of the invention will occur to a person having an ordinary skill in the art without departing from the spirit and scope of the present invention as claimed in the appended claims.

What is claimed is:

1. Coated metal fine particles coated with a coating including an alkylamine,
   wherein an alkylamine having 6 or more carbon atoms, and an alkylamine having 5 or less carbon atoms are included in the coating, and wherein the coating has an elimination rate when heated to 160 degrees Celsius is 51% or more.

2. The coated metal fine particles according to claim 1, wherein a weight fraction of the coating in the coated metal fine particles is 20 weight % or less.

3. The coated metal fine particles according to claim 1, wherein an average particle diameter of the coated metal fine particles is 30 nm or less.

4. The coated metal fine particles according to claim 1, wherein the metal of the coated metal fine particles consists of silver.

5. A coated metal microparticle dispersion solution, the coated metal fine particles according to claim 1 are dispersed in an organic solvent.

6. The coated metal microparticle dispersion solution according to claim 5,
   wherein a weight fraction of metal fine particles is 30 weight % or more.

7. The coated metal fine particles according to claim 1, wherein the alkylamine having 6 or more carbon atoms is an alkylamine having 6 to 9 carbon atoms.

8. The coated metal fine particles according to claim 1, wherein the alkylamine having 6 or more carbon atoms is an alkylamine having 6 to 8 carbon atoms.

9. The coated metal fine particles according to claim 1, wherein an alkylamine having 6 or more carbon atoms, an alkylamine having 5 or less carbon atoms, and a fatty acid are included in the coating.

* * * * *